(12) United States Patent
Jordan

(10) Patent No.: US 11,905,923 B2
(45) Date of Patent: Feb. 20, 2024

(54) WIND TURBINE TOWER SEGMENT FOR A WIND TURBINE TOWER AND METHOD

(71) Applicant: Wobben Properties GmbH, Aurich (DE)

(72) Inventor: Holger Jordan, Irxleben (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/276,636

(22) PCT Filed: Aug. 12, 2019

(86) PCT No.: PCT/EP2019/071593
§ 371 (c)(1),
(2) Date: Mar. 16, 2021

(87) PCT Pub. No.: WO2020/057864
PCT Pub. Date: Mar. 26, 2020

(65) Prior Publication Data
US 2022/0042490 A1    Feb. 10, 2022

(30) Foreign Application Priority Data

Sep. 17, 2018   (DE) ...................... 10 2018 122 638.1

(51) Int. Cl.
*F03D 13/20*       (2016.01)
*F03D 13/10*       (2016.01)
(Continued)

(52) U.S. Cl.
CPC ........... *F03D 13/20* (2016.05); *E04H 12/085* (2013.01); *F03D 13/10* (2016.05); *F03D 80/80* (2016.05);
(Continued)

(58) Field of Classification Search
CPC .......... F03D 80/85; F03D 80/82; F03D 80/88; F03D 80/80; F05B 2260/964; E06C 9/02
See application file for complete search history.

(56) References Cited

U.S. PATENT DOCUMENTS 8,336,687 B2 * 12/2012 Kawabata ............... F03D 80/00
                                                                         415/908
8,413,405 B2    4/2013 Meesenburg
(Continued)

FOREIGN PATENT DOCUMENTS

CA          2963586 A1    4/2016
CN        104755751 A     7/2015
(Continued)

*Primary Examiner* — Andrew J Triggs
(74) *Attorney, Agent, or Firm* — SEED INTELLECTUAL PROPERTY LAW GROUP LLP

(57) ABSTRACT

A wind-power-installation tower segment, a wind-power-installation tower, a wind power installation, a use of a holding arrangement, a use of a first transport device and of a second transport device, and to methods for assembling a wind-power-installation tower segment and for assembling a wind-power-installation tower section. In particular, a wind-power-installation tower segment for a wind-power-installation tower, comprising a shell segment, having an extent in the direction of a segment height, a segment ring direction and a segment thickness, and an upper horizontal abutment side and a lower horizontal abutment side, a holding device for arranging requisites inside a wind-power-installation tower segment, having a main section, and at least one projecting section, wherein the main section and the at least one projecting section are arranged adjacently to each other in the segment ring direction, wherein the main section and the at least one projecting section enclose a holding-device angle, a coupling device, which is arranged in a coupling section of the shell segment, adjoining the upper horizontal abutment side, wherein the holding device is coupled to the shell segment by means of the coupling device.

15 Claims, 13 Drawing Sheets

(51) Int. Cl.
*E04H 12/08* (2006.01)
*F03D 80/80* (2016.01)
*E06C 9/02* (2006.01)

(52) U.S. Cl.
CPC ............. *F03D 80/88* (2016.05); *E06C 9/02* (2013.01); *F05B 2260/964* (2013.01)

(56) References Cited

U.S. PATENT DOCUMENTS

| | | | |
|---|---|---|---|
| 8,776,967 B2* | 7/2014 | Ollgaard | ................ F03D 80/88 |
| | | | 188/379 |
| 10,227,790 B2 | 3/2019 | Samuelsen | |
| 2013/0034450 A1 | 2/2013 | Samuelsen | |
| 2016/0215520 A1* | 7/2016 | Samuelsen | .............. F03D 13/10 |
| 2018/0313106 A1* | 11/2018 | Chase | ....................... E06C 9/02 |
| 2022/0042490 A1* | 2/2022 | Jordan | .................... F03D 80/88 |

FOREIGN PATENT DOCUMENTS

| | | |
|---|---|---|
| DE | 102005033600 B3 | 12/2006 |
| DE | 102005049289 A1 | 4/2007 |
| DE | 202010007565 U1 | 10/2010 |
| DE | 102010015075 A1 | 10/2011 |
| DE | 102012008120 A1 | 10/2013 |
| DE | 102013217088 A1 | 3/2015 |
| DE | 102014119610 A1 | 6/2016 |
| EP | 2199497 A2 | 6/2010 |
| EP | 2653715 A1 | 10/2013 |
| EP | 3048295 A1 | 7/2016 |
| WO | WO 2005021897 A1 | 3/2005 |
| WO | 2017/039915 A1 | 3/2017 |

\* cited by examiner

WIND TURBINE TOWER SEGMENT FOR A WIND TURBINE TOWER AND METHOD

BACKGROUND

Technical Field

The invention relates to a wind-power-installation tower segment, a wind-power-installation tower, a wind power installation, a use of a holding arrangement, a use of a first transport device and of a second transport device, and to methods for assembling a wind-power-installation tower segment and for assembling a wind-power-installation tower section.

Description of the Related Art

Wind power installations are well known. Modern wind power installations usually pertain to so-called horizontal-axis wind power installations, in which the rotor axis is arranged substantially horizontally and the rotor blades sweep a substantially vertical rotor area. In addition to a rotor arranged on a nacelle, wind power installations usually comprise a tower, on which the nacelle, with the rotor, is arranged so as to be rotatable about a substantially vertically oriented axis.

Towers are usually slender structures, preferably of great height, and further preferably of comparatively small dimensions orthogonal to that height. Towers may be substantially made of or comprise concrete and/or steel. Towers may further be composed of a single structural member or a plurality of structural members, or comprise such structural members. Towers may have cylindrical and/or conical sections, in particular along their longitudinal extent, towers often comprising cylindrical and conical sections. Furthermore, such sections may also be realized as ring segments, such that a cylindrical section is composed of different segments in a ring direction, or next to each other.

Towers of wind power installations, in particular of modern horizontal-axis wind power installations, contribute to a significant part of the total costs of manufacturing a wind power installation. Since such towers cannot be transported in one piece, or only at great expense, a major cost driver is the assembling of the wind power installation tower at the erection site of the wind power installation. In the case of towers that are segmented in the circumferential direction, in particular, the assembly effort and consequently the assembly costs are high.

Towers of wind power installations are usually equipped with various tower internals. Tower internals may include, for example, cable arrangements such as power cables, supply cables or control cables, elevator arrangements, working platforms, ladders or lighting units. Various solutions for arranging tower internals have been proposed, for example in DE 10 2012 008 120 A1, DE 20 2010 007 565 U1, DE 10 2005 049 289 A1 or EP 2 653 715 A1. However, a disadvantage of existing solutions is, inter alia, that the tower internals can usually only be assembled inside the tower at the erection site of the wind power installation, resulting in high costs and time-consuming assembly work. In addition, the cable arrangements usually require a large amount of space, such that only limited space is available for further tower internals.

The German Patent and Trade Mark Office has searched the following prior art in the priority application for the present application: EP 2 653 715 A1, DE 10 2012 008 120 A1, DE 20 2010 007 565 U1, DE 10 2005 049 289 A1, DE 10 2013 217 088 A1.

BRIEF SUMMARY

Proposed is a wind-power-installation tower segment, a wind-power-installation tower, a wind power installation, a use of a holding arrangement, a use of a first transport device and of a second transport device, and methods for assembling a wind-power-installation tower segment and for assembling a wind-power-installation tower section, that reduce or eliminate one or more of the stated disadvantages. Proposed are techniques that allow for a better utilization of space inside the tower.

Proposed is a wind-power-installation tower segment for a wind-power-installation tower, comprising a shell segment, having an extent in the direction of a segment height, a segment ring direction and a segment thickness, and an upper horizontal abutment side and a lower horizontal abutment side, a holding device for arranging requisites inside a wind-power-installation tower segment, having a main section, and at least one projecting section, wherein the main section and the at least one projecting section are arranged adjacently to each other in the segment ring direction, wherein the main section and the at least one projecting section enclose a holding-device angle, a coupling device, which is arranged in a coupling section of the shell segment, adjoining the upper horizontal abutment side, wherein the holding device is coupled to the shell segment by means of the coupling device.

The techniques proposed herein are based, inter alia, on the knowledge that the arrangement of requisites, in particular cables, in the interior of a wind-power-installation tower may be configured in a particularly space-saving manner by means of a holding device having a main section and at least one projecting section that enclose a holding-device angle. Furthermore, the techniques are based on the knowledge that it is particularly advantageous if a holding device for the arranging of requisites, in particular cables, may already be preassembled on a shell segment before the actual assembly of the wind-power-installation tower and thus, for example, may already be arranged on a shell segment in the workshop. The usually time-consuming assembling at the erection site of the wind power installation can thus be simplified.

For this purpose, the solution provides the holding device having the main section and the at least one extension section that enclose the holding-device angle. The holding device preferably has a direction of main extent that is greater than 20 meters, and/or less than 20 meters, and/or less than 18 meters, and/or less than 15 meters, and/or less than 12 meters, and/or less than 10 meters. The shell segment may in principle assume any possible geometry. In particular, it is preferred that the shell segment extends along the segment ring direction having a constant radius around an axis of symmetry. Shell segments arranged next to each other are preferably arranged concentrically. A tower formed from such shell segments arranged in such a manner usually has a substantially circular cross-section. However, the shell segment may also be polygonal in the segment ring direction. A tower formed from such shell segments usually has a polygonal cross-section.

The extent in the direction of the segment height and the segment ring direction allows a trapezoidal or rectangular area to be spanned. The trapezoidal design is preferred, for example, for such shell segments that are used on conical sections of the wind-power-installation tower. The rectangular design is preferred, for example, for a cylindrical section of the wind-power-installation tower. The segment thickness may also be referred to as the wall depth. Consequently, the segment annular direction is usually the direction orthogonal to the segment height and orthogonal to the segment thickness.

The upper horizontal abutment side and the lower horizontal abutment side are to be understood, in particular, as such sides of the shell segment that, following assembly to form a wind-power-installation tower, face toward a shell segment arranged above or below. The upper horizontal abutment side is preferably realized as a horizontal abutment side that faces toward the top of the tower. In addition, the lower horizontal abutment side is preferably realized as a horizontal abutment side that faces away from the top of the tower.

The main section and the at least one projecting section are arranged adjacently to each other in the segment ring direction. This means, in particular, that they are arranged adjacently to each other substantially orthogonally to the segment height and substantially orthogonally to the segment thickness. The coupling device is arranged in the coupling section. Preferably, the coupling section extends, starting from the upper horizontal abutment side, in the direction of the segment height with an extent that is less than 50% of the segment height. Moreover, preferably, the extent of the coupling portion in the direction of the segment height, starting from the horizontal abutment side, is less than 40%, and/or less than 30%, and/or less than 20%, and/or less than 10%, and/or less than 5%, and/or less than 2%, and/or less than 1% of the segment height. Furthermore, it is preferred that an end of the coupling device that faces toward the upper horizontal abutment side is spaced less than 5 meters, and/or less than 4 meters, and/or less than 3 meters, and/or less than 2 meters, and/or less than 1 meter from the upper horizontal abutment side.

It is further preferred that the shell segment has a first vertical abutment side having a first vertical flange, and/or a second vertical abutment side having a second vertical flange. It is further preferred that the first vertical flange and/or the second vertical flange encloses, or enclose, an angle with the shell segment. Furthermore, a connection element may be arranged in a projecting manner on the first vertical flange and/or the second vertical flange. In a preferred embodiment variant of the wind-power-installation tower segment, it is provided that the coupling device is arranged at the first vertical flange and/or the second vertical flange. Alternatively, the holding device may also be arranged on the projecting connection element. Furthermore, the shell segment may have, on its upper horizontal abutment side, a horizontal flange, which is preferably arranged and configured that the coupling device can be arranged thereon.

The holding device is preferably arranged on the coupling device. The arrangement may be effected, for example, by means of a bolt connection. Furthermore, the holding device may be arranged in a suspended manner on the coupling device, such that the coupling device substantially absorbs forces in the direction of the segment height and/or in the direction of a direction of main extent of the holding device.

Such a wind-power-installation tower segment facilitates the pre-fitting of operating equipment, in particular cables. The complete assembling of the wind-power-installation tower segment may be performed in the workshop and/or on the construction site, irrespective of the actual tower manufacture and/or assembly. Furthermore, two or more holding devices may also be provided for a wind-power-installation tower, in that two or more wind-power-installation tower segments, each comprising at least one holding device, are installed in the wind-power-installation tower, in which case these wind-power-installation tower segments may be arranged one above the other and/or next to each other. If two or more wind-power-installation tower segments having holding devices are arranged one above the other, it is preferred that the respective holding devices are not connected to each other. As a result of the holding devices not being connected to each other, the displacement of the individual holding devices on the tower wall is reduced.

Preferably, ladders or ladder sections arranged on the holding devices are connected to each other. For a fitter, it is possible to reach the at least one projecting section directly from the main section of the holding device, and to perform assembly activities there. In particular, from the main section a fitter can mount cables on the at least one projecting section, in which case no additional assembly platform may be required. The connection of cables of holding devices arranged one above the other is preferably effected by means of cable screw connectors. The wind-power-installation tower segments, and in particular the holding devices, may be further developed in such a way that they can guide an elevator system, or a lift system, in which case the strength of the holding devices may have to be increased.

In a preferred embodiment variant of the wind-power-installation tower segment, it is provided that it comprises a horizontal bearing, which is arranged in a bearing section, adjoining the lower horizontal abutment side of the shell segment, wherein the holding device is supported by means of the horizontal bearing, wherein preferably the horizontal bearing is arranged and configured to act as a fixed bearing for bearing forces orthogonal to the segment height and/or to a direction of main extent of the holding device, and/or preferably as a loose bearing for bearing forces in the direction of the segment height and/or direction of main extent of the holding device.

Preferably, in this embodiment variant, the coupling device faces toward the upper horizontal abutment side, and the horizontal bearing faces away from the upper horizontal abutment side. In particular, it is preferred that the horizontal bearing is spaced from the lower horizontal abutment side, in the direction of the segment height, by less than 50% of the segment height. Further, preferably, the horizontal bearing is spaced from the lower horizontal abutment side, in the direction of the segment height, by less than 40%, and/or less than 30%, and/or less than 20%, and/or less than 10%, and/or less than 5%, and/or less than 2%, and/or less than 1% of the segment height. It is further preferred that the spacing of the horizontal bearing from the lower horizontal abutment side is less than 5 meters, and/or less than 4 meters, and/or less than 3 meters, and/or less than 2 meters, and/or less than 1 meter. The horizontal bearing is preferably arranged and configured to limit or prevent vibrations of the holding device.

The horizontal bearing realized as a fixed bearing for bearing forces orthogonal to the segment height and/or orthogonal to a direction of main extent of the holding device acts, in particular, in such a manner upon the holding device that the latter can move in the direction of main extent and/or in the direction of the segment height and/or in the vertical direction of a wind-power-installation tower, but substantially not orthogonally to this direction of movement. The horizontal bearing realized as a loose bearing for bearing forces in the direction of the segment height and/or the direction of main extent of the holding device acts, in particular, in such a manner upon the holding device that substantially no forces can be absorbed by the horizontal bearing in this direction.

According to a further preferred embodiment variant of the wind-power-installation tower segment, it is provided that the coupling device is arranged and configured, in the case of proper arrangement of the wind-power-installation tower segment, to couple the holding device to the shell segment in such a manner that the direction of main extent of the holding device is oriented substantially vertically, and/or the coupling device is arranged and configured on the holding device to act as a fixed bearing for forces in the direction of the segment height and/or the direction of main extent of the holding device.

Proper arrangement of the wind-power-installation tower segment means, in particular, that it is arranged as intended with shell segments and/or further wind-power-installation tower segments to form a wind-power-installation tower. In particular, the wind-power-installation tower has a substantially vertical tower axis which, moreover, may be realized as an axis of symmetry.

A further preferred development of the wind-power-installation tower segment is characterized in that the coupling device is attached to the mantle segment. The attachment of the coupling device to the shell segment may be effected in a form-fitting and/or force-fitting and/or materially bonded manner. In particular, it is preferred that the coupling device is connected to the shell segment by means of a screwed connection.

Furthermore, the wind-power-installation tower segment preferably comprises a vibration damper, wherein the vibration damper is arranged and configured to damp vibrations orthogonal to the segment height and/or direction of main extent of the holding device, wherein preferably the horizontal bearing comprises the vibration damper and/or preferably the horizontal bearing constitutes the vibration damper, wherein preferably the vibration damper is constituted by an element, or two or more elements, in particular a plate, or two or more plates, for example of plastic, bearing against the holding device on one, two or more sides.

In particular, it is preferred that the vibration damper surrounds the holding device, or a part of the holding device, in the radial direction. The plates formed of plastic may, for example, be made of or comprise polyethylene. The plates may be arranged on a longitudinal member of the holding device, which is explained in greater detail further below.

Such a vibration damper, which is preferably realized with the horizontal bearing, enables the holding device to be securely arranged on the shell segment. Owing to the large extents in the direction of main extent of the holding device inside a wind-power-installation tower, vibrations of the holding device may occur. In particular, when a natural frequency of the holding device is reached, unwanted movements of the holding device may occur, which can be prevented by a vibration damper. The vibration damper prevents resonance with the natural frequency of the wind-power-installation tower, thereby enabling the stability, safety and service life of the wind-power-installation tower to be improved.

In a preferred embodiment variant of the wind-power-installation tower segment, it is provided that there is a ladder arranged on the main section. The ladder is preferably arranged and configured so that a person can climb up and/or down it. By means of the ladder a fitter is able, for example, to move vertically along the main section, and from the ladder to reach the at least one projecting section, in order to perform assembly work there, for example arranging cables.

According to a further preferred embodiment variant of the wind-power-installation tower segment, it is provided that it comprises a first projecting section and a second projecting section, wherein the first projecting section is arranged on a first side of the main section, and the second projecting section is arranged on a second side of the main section that is opposite the first side.

The capacity for the arrangement of requisites, in particular cables, on a holding device having a first projecting section and a second projecting section can be significantly greater than in the case of a holding device having only one projecting section. In addition, different requisites may be arranged on the two projecting sections, such that the organization of the assembly work is simplified.

A further preferred development of the wind-power-installation tower segment is characterized in that it comprises at least one cable, wherein the cable is arranged on the at least one projecting section, and is preferably spaced less than 1.5 meters and/or less than 1.25 meters and/or less than 1 meter and/or less than 0.75 meter and/or less than 0.5 meter from the main section. Consequently, it is made easier for the fitter to reach the cables.

It is further preferably provided that the holding-device angle is less than 170 degrees of arc, and/or less than 165 degrees of arc, and/or less than 160 degrees of arc, and/or less than 155 degrees of arc, and/or less than 150 degrees of arc, and/or less than 145 degrees of arc. The less the selected holding-device angle differs from 180 degrees, the less the at least one projecting section projects into the wind-power-installation tower. Furthermore, the distance of the at least one projecting section from the shell segment is then rather small, such that this substantially unusable volume between the projecting section and shell segment is kept as small as possible. It is additionally preferred that the holding-device angle is less than 180 degrees of arc, and/or less than 175 degrees of arc, in particular preferably 163 degrees of arc, and/or less than 140 degrees of arc, and/or less than 135 degrees of arc, and/or less than 130 degrees of arc, and/or less than 125 degrees of arc, and/or less than 120 degrees of arc, and/or less than 115 degrees of arc, and/or less than 110 degrees of arc, and/or less than 105 degrees of arc, and/or less than 100 degrees of arc, and/or less than 95 degrees of arc, and/or less than 90 degrees of arc.

In a further preferred development of the wind-power-installation tower segment, it is provided that the shell segment has an axis of symmetry, the holding device extends from an upper holding end to a lower holding end, and the holding device is arranged on the shell segment in such a manner that a first axial distance between the axis of symmetry and the upper holding end is greater than a second axial distance between the axis of symmetry and the lower holding end.

The axis of symmetry of the shell segment is preferably oriented parallel to the axis of the wind-power-installation tower created by the wind-power-installation tower segment. Usually, the axis of symmetry of the shell segment is likely to be arranged coaxially with the axis of the wind-power-installation tower. A holding device arranged as described above has the particular advantage that a fitter present on the holding device does not have to perform any so-called overhead work. This is because the holding device is slightly inclined outward, toward the outer wall of the wind-power-installation tower segment. Due to such an inclination, a fitter may safely climb up and/or down the holding device and, in particular, perform assembly work more safely.

In a preferred embodiment variant of the wind-power-installation tower segment, it is provided that the main section of the holding device comprises at least one first longitudinal member, which extends with a first longitudinal-member longitudinal direction substantially parallel to the segment height and/or direction of main extent of the holding device. The first longitudinal member may have, for example, a rectangular hollow profile. Alternatively, the first longitudinal member may have a T-shaped or double T-shaped profile. Furthermore, the longitudinal member may also have a solid profile. It is furthermore preferably provided that the at least one projecting section comprises at least one first projecting crossmember having a first crossmember longitudinal direction, the first crossmember longitudinal direction having a directional component oriented orthogonally to the first longitudinal-member longitudinal direction. In particular, it is preferred that the crossmember longitudinal direction is oriented orthogonally to the first longitudinal-member longitudinal direction.

Moreover, it may be preferred that the main section of the holding device has a second longitudinal member having a second longitudinal-member longitudinal direction. Preferably, the second longitudinal-member longitudinal direction is oriented parallel to the first longitudinal-member longitudinal direction. The first longitudinal member is preferably spaced from the second longitudinal member in the segment ring direction. Moreover, it is preferably provided that the main section of the holding device has at least one main crossmember, which extends from the first longitudinal member to the second longitudinal member. The direction of main extent of the main crossmember is preferably oriented orthogonally to the first longitudinal-member longitudinal direction and/or to the second longitudinal-member longitudinal direction, or has a directional component in the direction of the first longitudinal-member longitudinal direction and/or of the second longitudinal-member longitudinal direction. Preferably, the at least one projecting section is arranged on the first longitudinal member and/or on the second longitudinal member. Furthermore, the first projecting section may be arranged on the first longitudinal member, and the second projecting section on the second longitudinal member.

In a preferred embodiment variant of the wind-power-installation tower segment, it is further provided that the at least one projecting section comprises the at least one projecting crossmember, or is realized as a projecting crossmember. Preferably, the at least one projecting section comprises two or more projecting crossmembers, which in addition are preferably spaced from each other in the direction of the direction of main extent of the holding device. The two or more projecting crossmembers are preferably arranged equidistantly. In particular, it is preferred that the at least one projecting section comprises a total of four projecting crossmembers. The projecting crossmembers may be realized as a direct, but angled, extension of a main crossmember of the main section.

A further preferred development of the wind-power-installation tower segment provides that the main section comprises a central longitudinal member, the central-longitudinal-member longitudinal direction of which is oriented parallel to the first longitudinal-member longitudinal direction and/or to the second longitudinal-member longitudinal direction. The central longitudinal member may be arranged, in the segment ring direction, between the first longitudinal member and the second longitudinal member, and is preferably connected to the main crossmember. Moreover, it is preferred that the ladder is arranged on the central longitudinal member and/or on the first longitudinal member and/or on the second longitudinal member. The second longitudinal member may be similar in design to the first longitudinal member. The central longitudinal member may likewise be similar in design to the first longitudinal member. Moreover, it is preferred that the central longitudinal member has a rectangular solid profile. The holding device is preferably composed of or comprises steel.

According to a further aspect of the present invention, proposed is a wind-power-installation tower comprising at least one wind-power-installation tower segment according to at least one of the embodiment variants described above.

In particular, it is preferred that the wind-power-installation tower comprises, in addition to the at least one wind-power-installation tower segment, a further shell segment that, in the vertical direction of the wind-power-installation tower, is arranged under the wind-power-installation tower segment. Under, in this context, means in particular that the further shell segment faces toward the base, and the wind-power-installation tower segment faces away from the base. It is additionally preferred that the further shell segment comprises a horizontal bearing, described above, but no coupling device that absorbs forces in a vertical direction. It is thus ensured that the holding device is coupled only to a shell segment, and consequently is arranged in a suspended manner in the wind-power-installation tower. Moreover, it is preferred that the further shell segment has a vibration damper, and/or the horizontal bearing comprises the vibration damper.

Moreover, the wind-power-installation tower may comprise a first wind-power-installation tower segment and a second wind-power-installation tower segment. In particular, the first wind-power-installation tower segment may be arranged vertically over the second wind-power-installation tower segment. The first holding device of the first wind-power-installation tower segment and the second holding device of the second wind-power-installation tower segment are preferably spaced from each other in the vertical direction. In particular, such a spacing of the first holding device from the second holding device is preferred to ensure decoupling of the two holding devices. It is additionally preferred that a ladder is arranged on the first holding device and on the second holding device. The ladder is preferably arranged on the first holding device and on the second holding device in such a manner that it is arranged in a stress-free manner even in the event of any vibrations or, for example, thermal expansion.

According to a further aspect of the present invention, proposed is a wind power installation comprising a wind-power-installation tower according to at least one of the embodiment variants described above.

Proposed is a use of a holding arrangement having a holding device and a coupling device, in a wind-power-installation tower segment for the arranging of requisites, in particular cables, wherein the holding device comprises a main section and at least one projecting section, the main section and the at least one projecting section are arranged adjacently to each other in a segment ring direction of the wind-power-installation tower segment, and the main section and the at least one projecting section enclose a holding-device angle.

According to a further aspect, proposed is a use of a first transport device for transporting a holding device, preferably with operating equipment, in particular cables, wherein the first transport device has a first basic frame having a first frame longitudinal direction, a first frame width and a first frame height, the first frame height corresponds substantially to an extent of the holding device in the radial direction, and the holding device is supported on the first transport device in such a manner that a side of a main section of the holding device that faces toward the axis of symmetry of the wind-power-installation tower segment is arranged on the transport device.

The radial direction of the holding device is to be understood as such radial direction that, when the holding device has been installed in a wind-power-installation tower segment, it corresponds to its radial direction, or to the radial direction of the wind power installation tower in which the holding device is installed. The first basic frame preferably has at least one fastening point, for example in the form of a bolt having an end disc that may be used, for example, for turning and/or lifting the frame.

In particular, it is preferred that the first basic frame extends in the longitudinal direction of the frame from a first end to a second end, the at least one fastening point being arranged in a section adjacent to the first end and/or the second end. The transport device can thus be arranged on a flat surface and thereupon the holding device can be arranged on the transport device. In particular, the holding device is arranged on the transport device in such a manner that a distal end and/or a distal edge of the projecting section face, or faces, toward the flat surface and just contacts the flat surface through the first frame height. As a result, the holding device can be transported and/or stored in a substantially stress-free manner and/or without damage by means of the first transport device. Furthermore, due to the imposed transport position of the holding device, there is little exposure to weather influences.

According to a further aspect proposed is a use of a second transport device for transporting a holding device, wherein the second transport device comprises a second basic frame having a second frame longitudinal direction, a second frame width, and a second frame height, wherein a supporting surface is constituted by the second frame longitudinal direction and the second frame width, and a first shoulder, the first shoulder is arranged, at least in sections, at an edge of the basic frame that is oriented parallel to the frame longitudinal direction, an upper end of the shoulder that faces away from the supporting surface is spaced from the supporting surface by a shoulder spacing, wherein the shoulder spacing corresponds substantially to the extent of the holding device in the radial direction, the holding device is supported, preferably fastened, on the transport device in such a manner that a side of a main section that faces away from the axis of symmetry of the wind-power-installation tower segment is arranged on the supporting surface, and an end of the at least one projecting section that faces away from the main section is arranged, preferably fastened, at the upper end of the shoulder.

The second transport device may have fastening points in a manner similar to the first transport device described above. The holding device is arranged with its main section on the supporting surface, specifically in such a manner that the at least one projecting section projects upward from the supporting surface and is arranged with one end at the upper end of the shoulder. As a result, the holding device is likewise transported in a substantially stress-free manner. It is clear that, by means of the second transport device, the holding device is transported, or stored, rotated by 180 degrees of arc about its longitudinal axis, in contrast to transport by means of the first transport device. The second transport device is advantageous, in particular, because the holding device is already in an installation position in which it is arranged on a shell segment in a subsequent step.

According to a further aspect, proposed is a method for assembling a wind-power-installation tower segment as claimed in at least one of the embodiment variants described above, comprising providing a shell segment, a holding device and a coupling device, wherein the holding device extends in a direction of main extent, in a width direction and in a thickness direction, raising the holding device by means of at least three transport elements, wherein the three transport elements are arranged at a fastening point of a lifting mechanism, and the transport elements are arranged at at least three fastening points of the holding device, wherein at least two fastening points are spaced in a direction of main extent of the holding device, and at least two fastening points are spaced in a width direction, arranging the holding device on an inner circumferential surface of the shell segment, coupling the holding device to the shell segment by means of the coupling device.

It is moreover preferred that the method described above comprises providing a crosshead, wherein the at least three lifting elements are arranged between the crosshead and the holding device, and the lifting elements are arranged on the crosshead, at at least two crosshead fastening points, wherein the two crosshead fastening points are spaced from each other in a longitudinal direction of the crosshead.

According to a further aspect, proposed is a method for assembling a wind-power-installation tower section, comprising providing at least one wind-power-installation tower segment according to at least one of the embodiment variants described above, and at least one second shell segment; arranging the at least one wind-power-installation tower segment and the at least one second shell segment in such a manner that they abut against each other at vertical abutment sides; preferably fastening the at least one wind-power-installation tower segment and the at least one second shell segment to each other.

The methods and uses according to the invention, as well as their possible further developments, have features or method steps that make them suitable, in particular, for use for a wind-power-installation tower segment according to the invention and its further developments. For further advantages, embodiment variants and embodiment details of these further aspects and their possible further embodiments, reference is also made to the previously given description relating to the corresponding features and further embodiments of the wind-power-installation tower segment.

BRIEF DESCRIPTION OF THE SEVERAL VIEWS OF THE DRAWINGS

Preferred embodiments of the invention are explained by way of example with reference to the accompanying figures. There are shown.

DETAILED DESCRIPTION

In the figures, elements that are identical, or substantially identical or similar in respect of function, are denoted by the same references.

Figure 1:
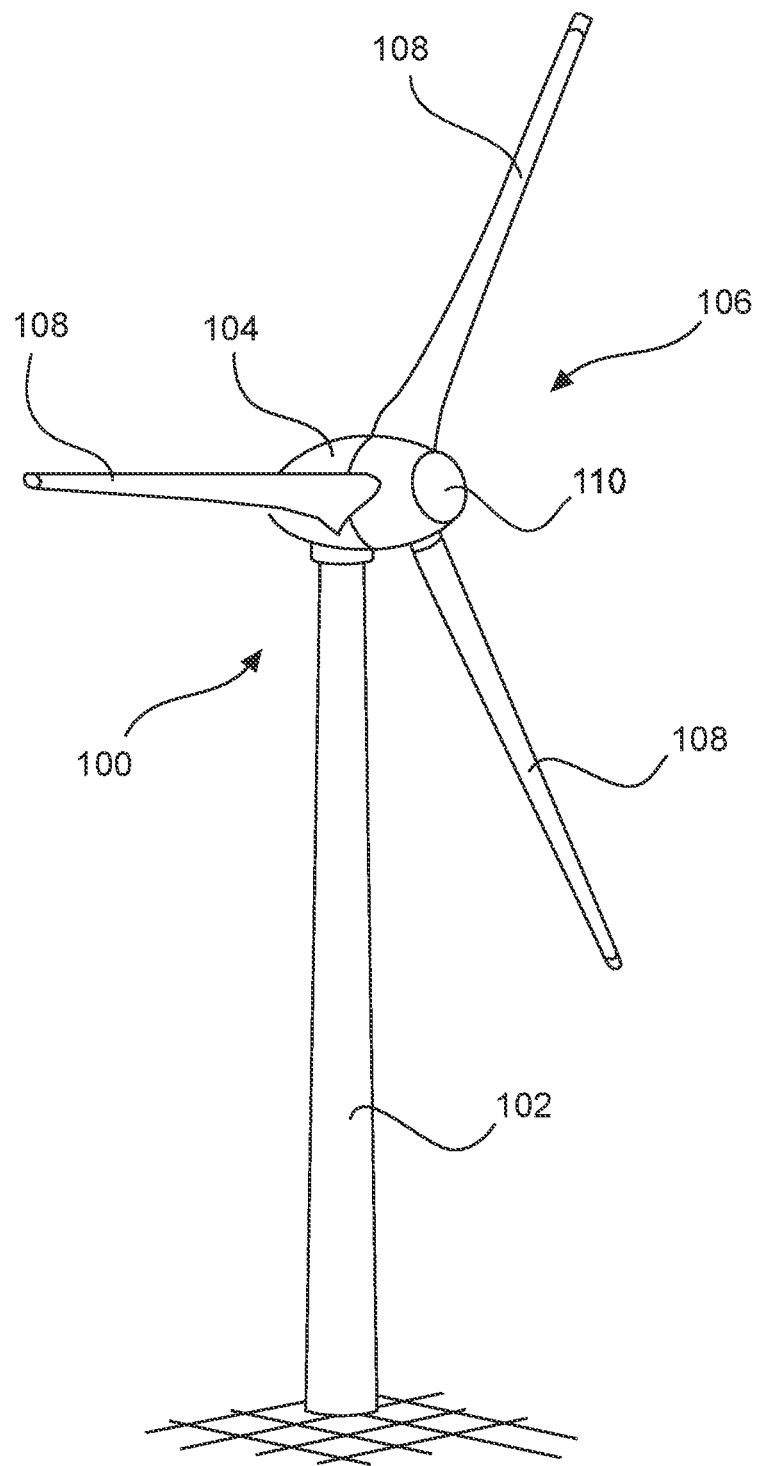
FIG. 1 shows a schematic three-dimensional view of an exemplary embodiment of a wind power installation.

FIG. 1 shows a schematic three-dimensional view of an exemplary embodiment of a wind power installation 100. FIG. 1 shows, in particular, a wind power installation 100 comprising a tower 102 and a nacelle 104. Arranged on the nacelle 104 there is a rotor 106 that has three rotor blades 108 and a spinner 110. When in operation, the rotor 106 is put into a rotating motion by the wind, and thereby drives a generator on the nacelle 104. The tower 102 comprises at least one wind-power-installation tower segment, described in greater detail on the basis of the further figures, comprising a shell segment, a holding device and a coupling device, the holding device being coupled to the shell segment by means of the coupling device.

Figure 2:
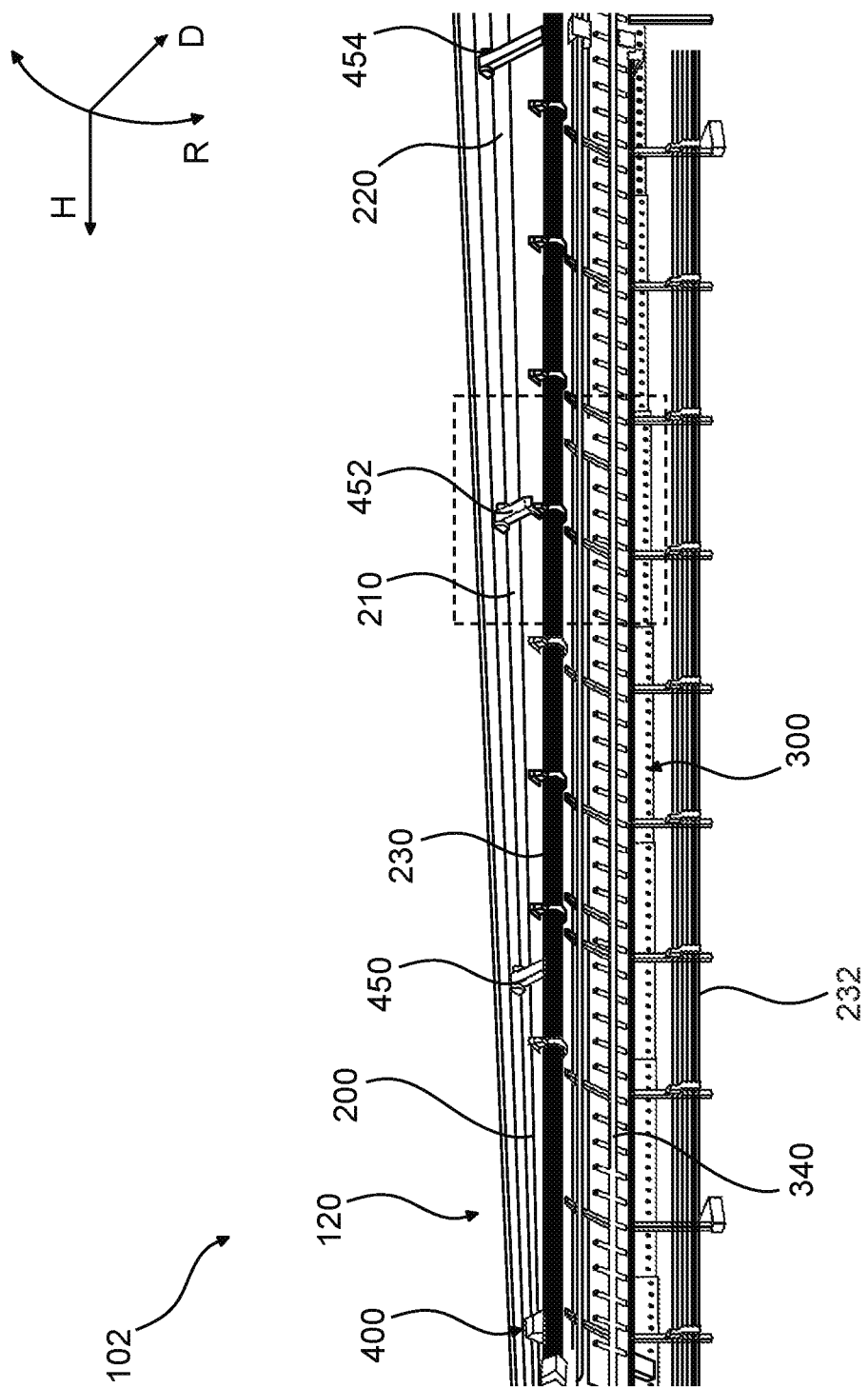
FIG. 2 shows a schematic three-dimensional view of an exemplary embodiment of a wind-power-installation tower.

FIG. 2 shows a schematic three-dimensional view of an exemplary embodiment of a wind-power-installation tower 102. The wind-power-installation tower 102 comprises a wind-power-installation tower segment 120 that has a first shell segment 200, a second shell segment 210 and a third shell segment 220. The first shell segment 200 faces toward a top of the tower. The third shell segment 220 faces toward a base of the tower and away from the top of the tower. The second shell segment 210 is arranged between the first shell segment 200 and the third shell segment 220.

The wind-power-installation tower segment 120 additionally has a holding device 300, which is arranged on the first shell segment 200, the second shell segment 210 and the third shell segment 220. The holding device 300 is arranged on the first shell segment 200, in particular, by means of a coupling device 400, the specific design of which is described in greater detail. The first shell segment 200 additionally has a first horizontal bearing 450, the second shell segment 210 has a second horizontal bearing 452, and the third shell segment 220 has a third horizontal bearing 454. The horizontal bearings 450, 452, 454 substantially absorb such forces that act orthogonally to a segment height. In particular, the horizontal bearings 450, 452, 454 absorb such forces that act parallel to a segment ring direction R and/or to a segment thickness D. The first horizontal bearing 450 is arranged in a section adjoining the lower horizontal abutment side of the shell segment 200.

The holding device 300 additionally comprises a ladder 340, which is arranged with its longitudinal direction parallel to a direction of main extent of the holding device 300. The holding device has a main section, which is described in greater detail below, and a total of two projecting sections, with a first cable bundle 230 being arranged on the first projecting section, and a second cable bundle 232 arranged on a second projecting section.

The shell segments 200, 210, 220 extend with their respective directions of main extent in the direction of the segment height H. In addition, the shell segments 200, 210, 220 extend in the segment direction R. Furthermore, the shell segments 200, 210, 220 extend in the direction of the segment thickness D, which may also be understood as a depth of the shell segments 200, 210, 220. The segment ring direction R is locally oriented orthogonally both to the segment height H and to the segment thickness D.

Figure 3:
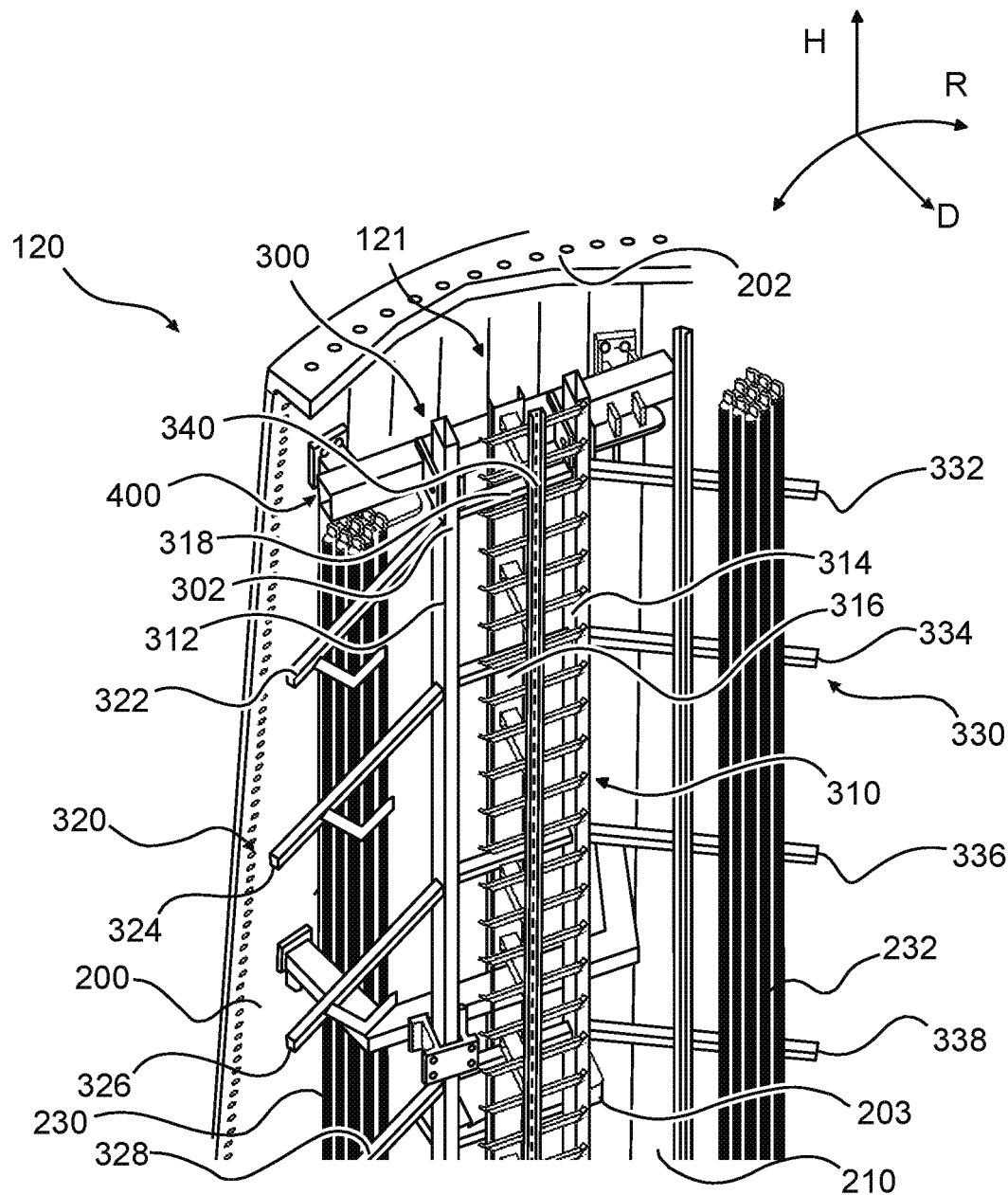
FIG. 3 shows a schematic three-dimensional partial view of a wind-power-installation tower segment of the wind-power-installation tower shown in FIG. 2.

The wind-power-installation tower segment 120 shown in FIG. 3 extends from an upper horizontal abutment side 202 to a lower horizontal abutment side, not shown. The wind-power-installation tower segment 120 has a coupling section 121 adjoining the upper horizontal abutment side 202. In the coupling section 121, the first shell segment 200 is coupled to the holding device 300 by means of the coupling device 400. The coupling device 400 is in particular arranged and designed so as to absorb forces generated by the holding device 300, in the direction of the segment height H. As described further below, the holding device 300 is arranged so as to be movable about an axis parallel to the ring direction R, such that this may also be referred to as a suspended arrangement.

The holding device 300 comprises a main section 310. The main section is constituted substantially by a first longitudinal member 312 and a second longitudinal member 314. The longitudinal members 312, 314 are spaced from each other in the segment ring direction R. In addition, the longitudinal members 312, 314 are arranged parallel to each other and parallel to the segment height H. Arranged centrally between the first longitudinal member 312 and the second longitudinal member 314 in the segment ring direction R there is a central longitudinal member 316. The central longitudinal member 316 is coupled to the longitudinal members 312, 314 via a plurality of main crossmembers 318.

The holding device 300 additionally has a first projecting section 320 and a second projecting section 330. The first projecting section 320 is arranged adjacently on the side of the main section 310 on which the first longitudinal member 312 is arranged. The second projecting section 330 is arranged adjacently on the side of the main section 310 on which the second longitudinal member 314 is arranged. The first projecting section 320 and the second projecting section 330 are in particular arranged in such a manner that the first projecting section 320 is arranged on a first side of the main section 310, and the second projecting section 330 is arranged on a second side of the main section 310 that is opposite the first side.

The first projecting section 320 is constituted by a first projecting crossmember 322, a second projecting crossmember 324, a third projecting crossmember 326 and a fourth projecting crossmember 328. The projecting crossmembers 322-328 have a crossmember longitudinal direction oriented orthogonally to the longitudinal direction of the longitudinal members 312, 314. There is thus substantially a right angle between the projecting crossmembers 322-328 and the first longitudinal member 312. The first projecting section 320 and the main section 310 enclose a holding-device angle 302.

The second projecting section 330 is constituted substantially by a fifth projecting crossmember 332, a sixth projecting crossmember 334, a seventh projecting crossmember 336 and an eighth projecting crossmember 338. The projecting crossmembers 332-338 are of substantially the same design as the projecting crossmembers 322-328. The projecting crossmembers 322-328 are spaced substantially equidistantly from each other. The further projecting crossmembers 332-338 are likewise spaced substantially equidistantly from each other.

Moreover, with respect to the segment height H, the first projecting crossmember 322 and the fifth projecting crossmember 332 are arranged at the same level. In addition, the second projecting crossmember 324 and the sixth projecting crossmember 334 are arranged on the same level with respect to the segment height H. The same applies to the third projecting crossmember 326 and the seventh projecting crossmember 336, and also to the fourth projecting crossmember 328 and the eighth projecting crossmember 338. It is also shown that the first cable bundle 230 is arranged on the first projecting section 320. In particular, the first cable bundle 230 is connected to the projecting crossmembers 322-328 by means of cable coupling elements. Similarly, the second cable bundle 232 is arranged on the second projecting section 330.

The lower horizontal abutment side of the first shell segment 200 is located in the region of the joint 203. The first shell segment 200 ends at the joint 203. Adjoining the first shell segment 200 in the direction of the segment height H is the second shell segment 210, the shell segments 200, 210 abutting against each other at the joint 203.

Figure 4:
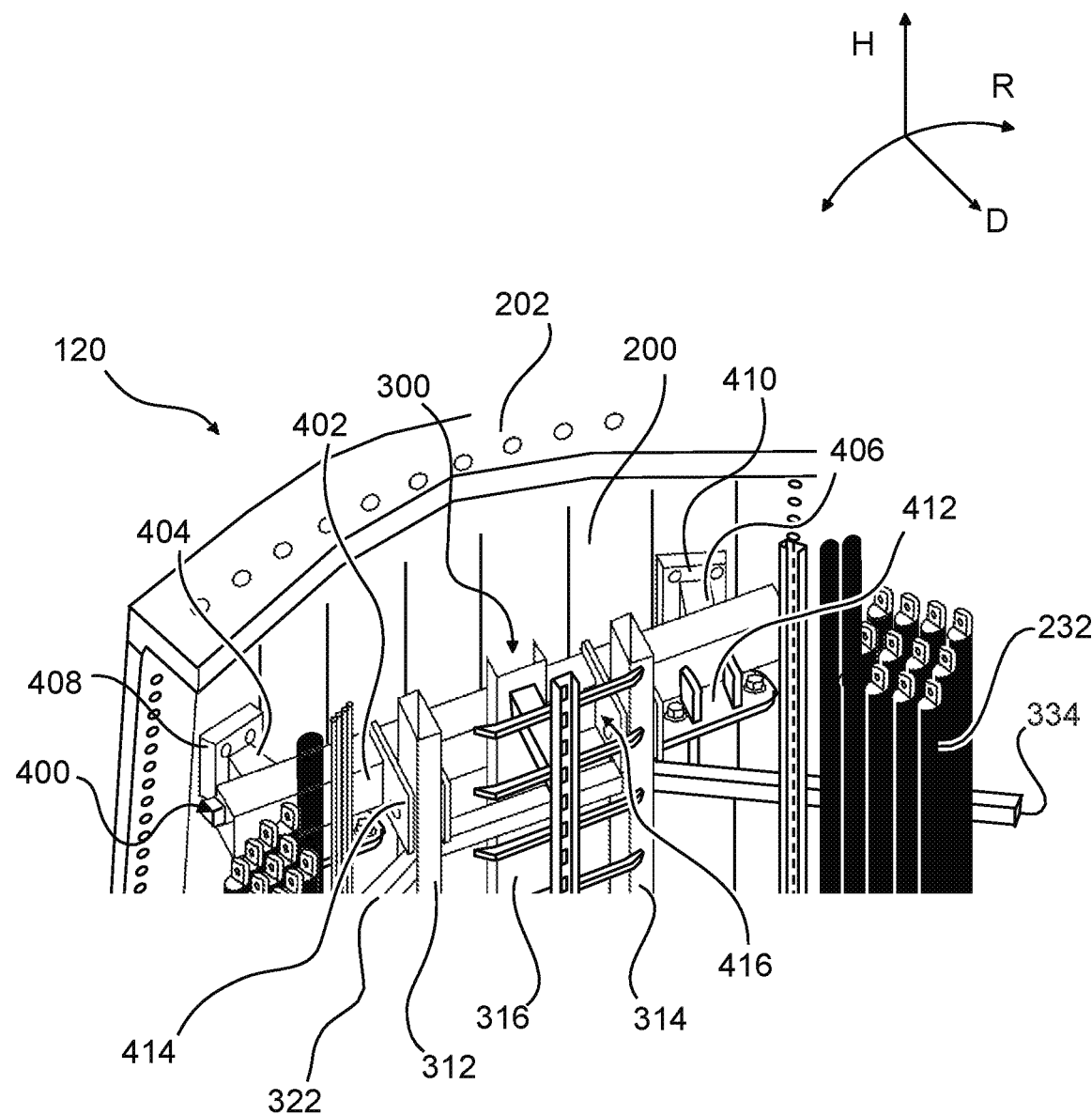
FIG. 4 shows a schematic three-dimensional detail view of the wind-power-installation tower segment shown in FIG. 3.

FIG. 4 shows a detail view of the coupling device 400. The coupling device 400 comprises a coupling crossbeam 402, which is coupled to the shell segment 200 by means of a first connecting rib 404 and a first fastening plate 408, and by means of a second connecting rib 406 and a second fastening plate 410. In this case the fastening plates 408, 410 are arranged on the shell segment 200. The connecting ribs 404, 406 are connected, by means of a screwed connection, to the fastening plates 408, 410 and to the shell segment 200. The connecting ribs 404, 406 project, substantially in the direction of the segment thickness, from an inner circumferential surface of the shell segment 200.

Arranged on the second connecting rib 406 there is a supporting plate 412, the supporting plate 412 having a horizontal supporting surface. A supporting plate that is not shown is similarly arranged on the first connecting rib 404. The coupling crossbeam 402 is supported on this horizontal supporting surface of the supporting plates 412, and is thus held in the vertical direction by the connecting ribs 404, 406 and the supporting plates 412.

Arranged between the first connecting rib 404 and the second connecting rib 406, on the side of the coupling crossbeam 402 that faces away from the shell segment 200, are a first coupling tie-piece 414 and a second coupling tie-piece 416. The coupling tie-pieces 414, 416 each comprise two vertically oriented plates, which are spaced from each other. In addition, these plate each have a through-opening, which have a common through-axis. The first longitudinal member 312 is arranged between the two plates of the first coupling tie-piece 414. The second longitudinal member 314 is arranged between the two plates of the second coupling tie-piece 416. Moreover, the first longitudinal member 312 and the second longitudinal member 314 each have a through-opening that is arranged and configured in such a manner that in each case a bolt can be passed through the openings of the coupling tie-pieces 414, 416 and through those of the longitudinal members. Secure fastening of the holding device 300 is consequently ensured in the direction of the segment height. Furthermore, the holding device 300 is arranged in a suspended manner, since it can swivel about the bolt axes.

Figure 5:
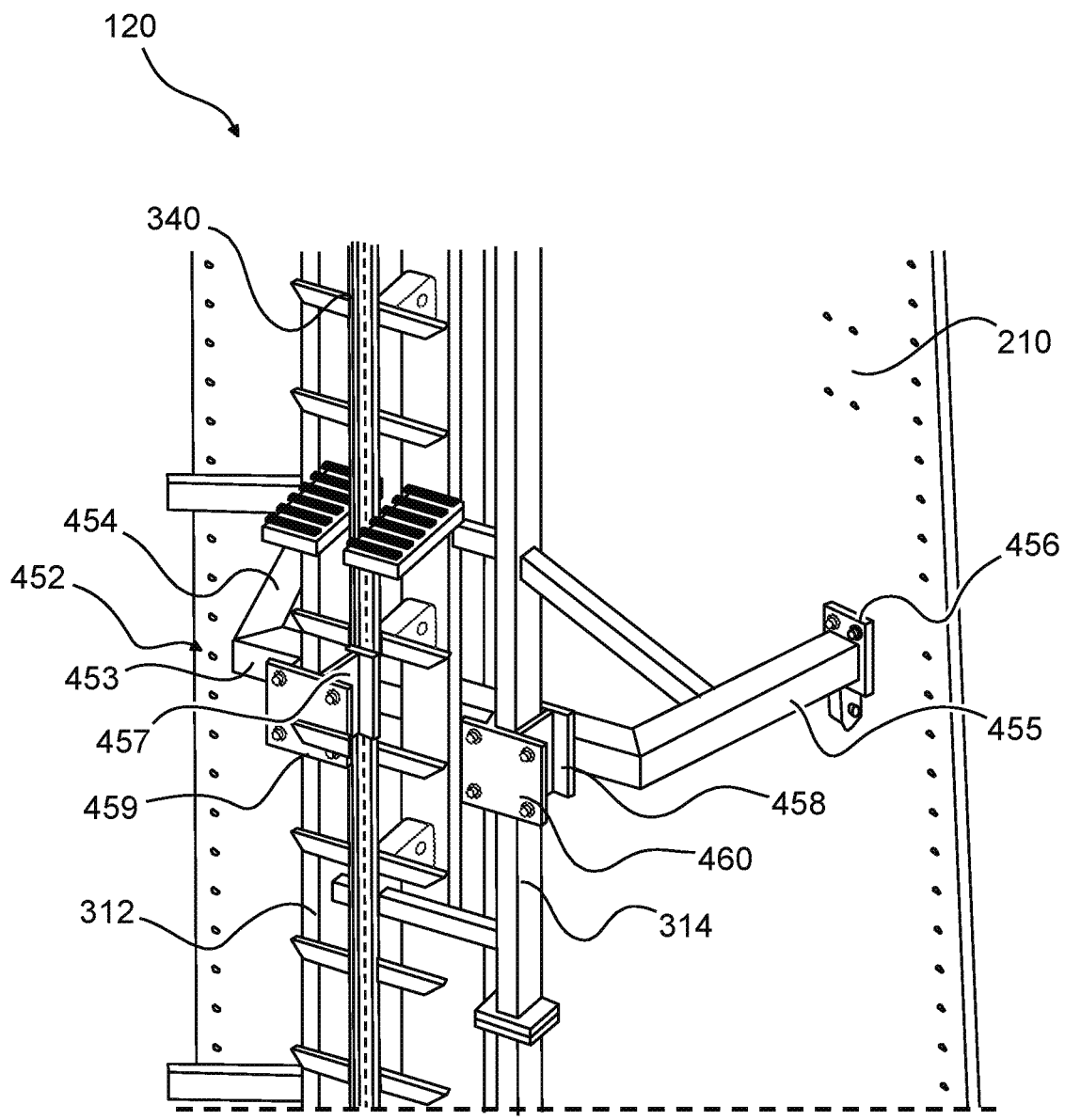
FIG. 5 shows a schematic three-dimensional detail view of a horizontal bearing of the wind-power-installation tower segment shown in FIG. 3.

FIG. 5 shows the design of the second horizontal bearing 452. The horizontal bearing 452 comprises a bearing crossbeam 453, as well as a first bearing connection 454 and a second bearing connection 455. The first bearing connection 454 is arranged with a first end on the shell segment 210 and with a second end on the bearing crossbeam 453. The second bearing connection 455 is likewise arranged with a first end on the shell segment 210 and with a second end on the bearing crossbeam 455. At the first end, the second bearing connection 455 is connected to the shell segment 210 by means of a connection plate 456 and a screwed connection. The first bearing connection 454 is arranged on the shell segment 210 in a similar manner.

The first bearing connection 454 and the second bearing connection 455 extend from the shell segment 210 in the direction of the interior, away from the shell segment 210. The second ends of the first bearing connection 454 and of the second bearing connection 455 that face away from the shell segment are connected to the bearing crossbeam 453.

Arranged on the bearing crossbeam 453 are a first bearing element 457 and a second bearing element 458. The first bearing element 457 comprises substantially two vertically oriented plates, which are arranged in such a manner that the first longitudinal member 312 can be arranged between them. The first longitudinal member 312 is enclosed on three sides, by the two plates of the first bearing element 457 and by the bearing crossbeam 453.

In order to realize a horizontal bearing, the fourth side is closed by means of a first bearing plate 459. The first bearing plate 459 is preferably composed of, or comprises, plastic. This makes it possible, for example, to achieve vibration damping. The second bearing element 458 is similar in design to the first bearing element 457, and arranged on the fourth side there is a second bearing plate 460, which may be similar in design to the first bearing plate 459. Enclosing of the second longitudinal member 314 on four sides can thus be achieved by means of the bearing crossbeam 453, the second bearing element 458 and the second bearing plate 460. The first bearing element 457 and the first bearing plate 459, as well as the second bearing element 458 and the second bearing plate 460, are arranged and configured so as to damp vibrations orthogonal to the segment height H and/or direction of main extent of the holding device 300.

Figure 6:
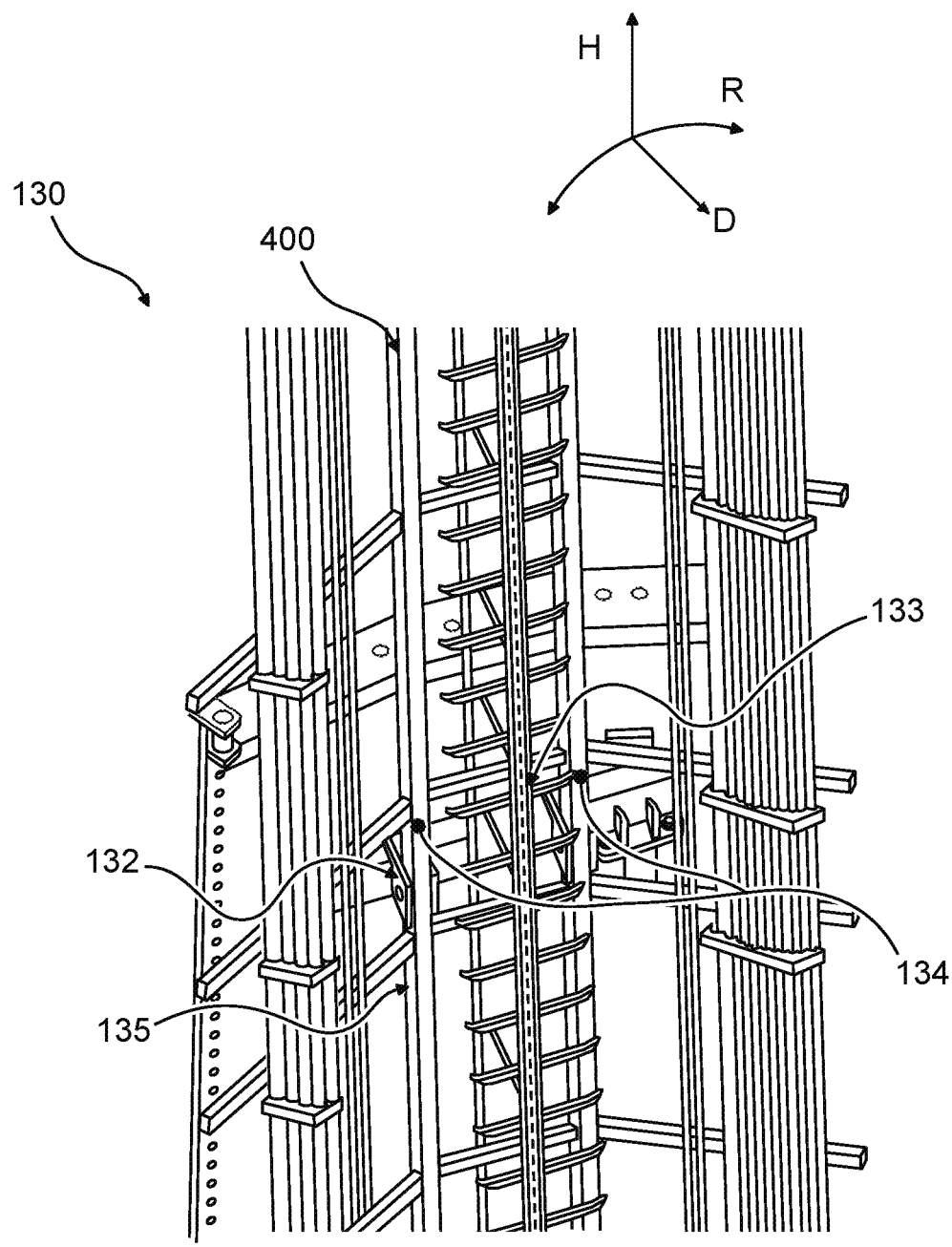
FIG. 6 shows a schematic three-dimensional view of a transition from a first wind-power-installation tower segment to a second wind-power-installation tower segment.

FIG. 6 shows a point of transition from the wind-power-installation tower segment 120 to a second wind-power-installation tower segment 130. The second wind-power-installation tower segment 130 has a second holding device 135 and a second coupling device 132. The second holding device 135 is arranged on the second coupling device 132, in a manner similar to the arrangement, described above, of the holding device 300 on the coupling device 400. In particular, the transition region 133 from the holding device 300 to the second holding device 135 is shown, the connection of the holding device 300 to the second holding device 135 being realized at two connection points 134. Preferably, the holding devices 135, 300 are connected to each other in such a manner that they have a play in the direction of the segment height H. Consequently, the holding devices 135, 300 can move, preferably with a predefined play, in the direction of the segment height H.

Figure 7:
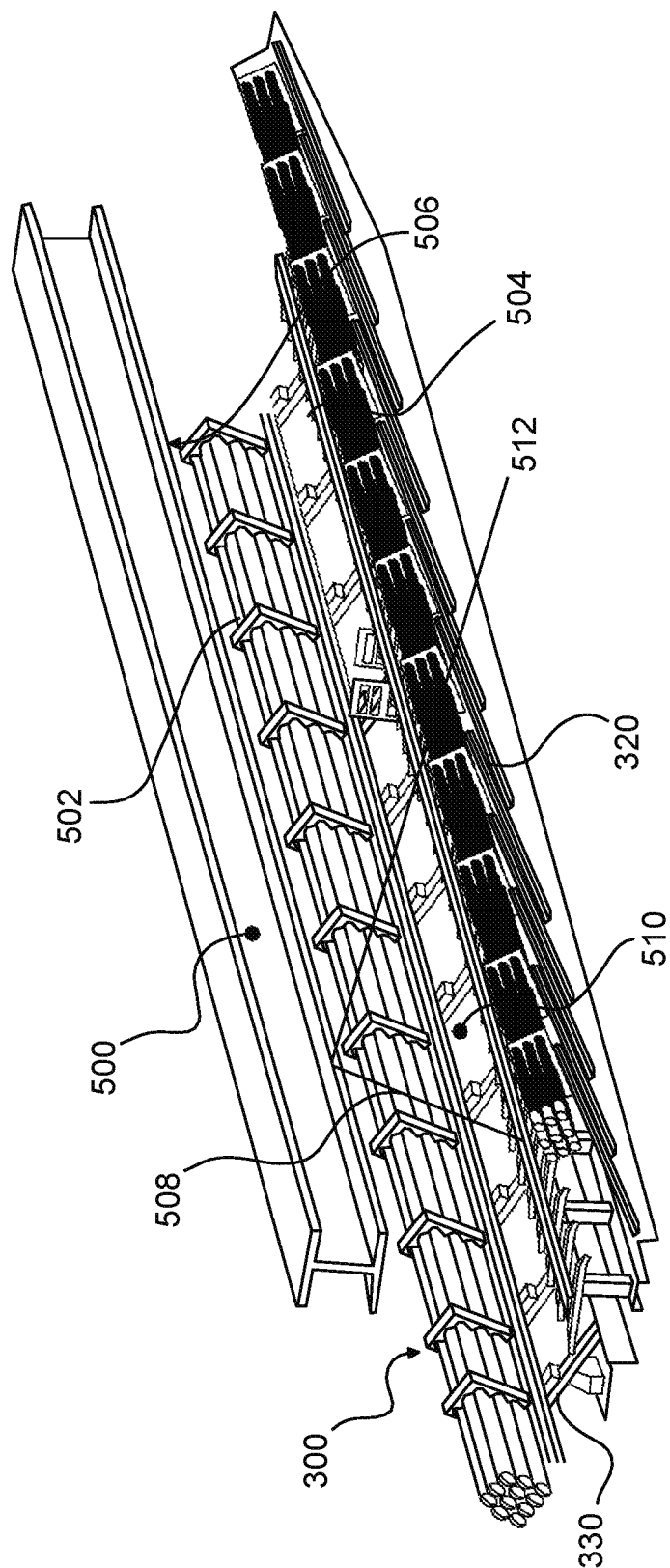
FIG. 7 shows a schematic three-dimensional view of an exemplary embodiment of an assembly crosshead for transporting a holding device.
Figure 8:
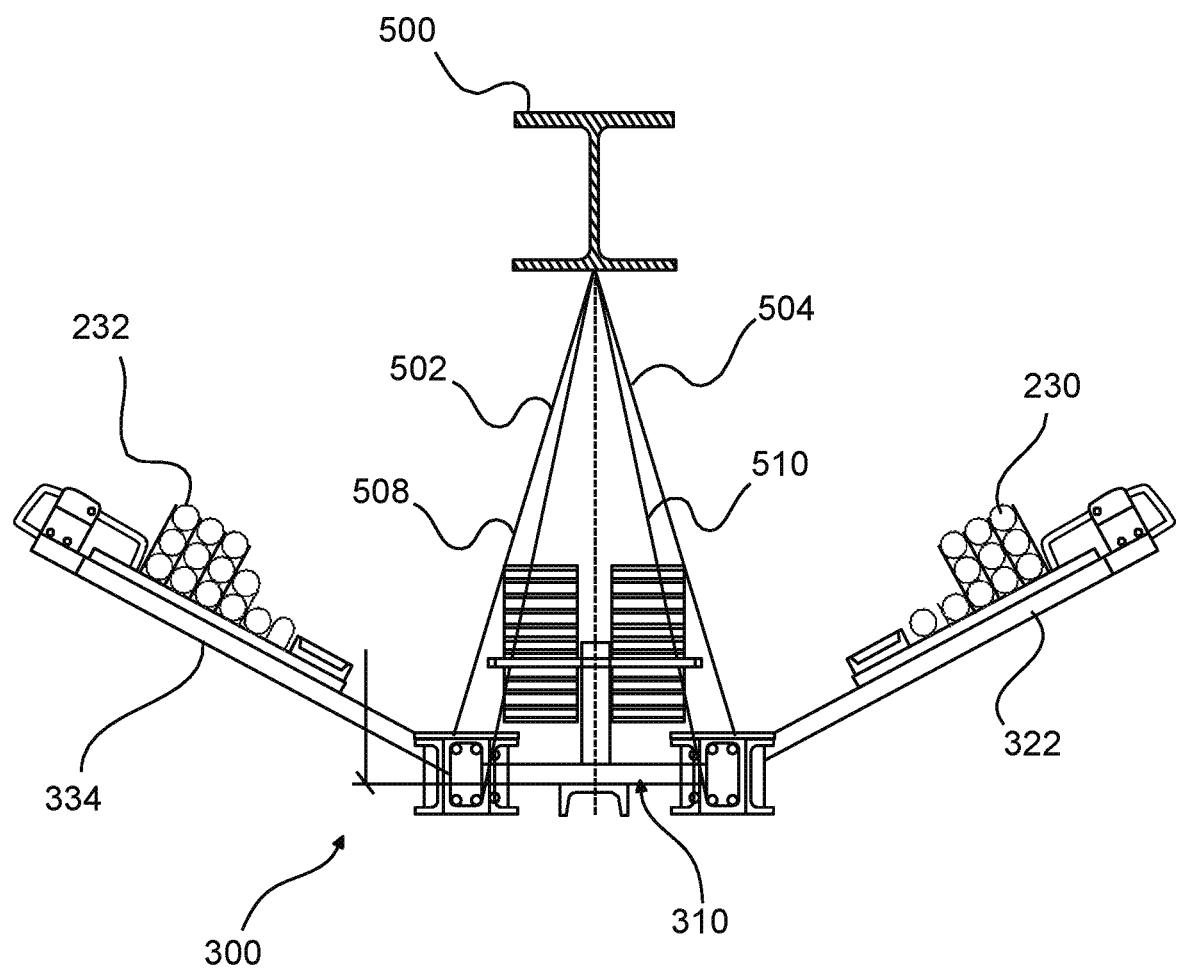
FIG. 8 shows a schematic two-dimensional view of the crosshead shown in FIG. 7 with a transported wind-power-installation tower segment.

FIGS. 7 and 8 shows a schematic three-dimensional view of an exemplary embodiment of an assembly crosshead 500 for transporting a holding device 300, which is preferably fully pre-fitted with operating equipment, in particular cables. The holding device 300 can be raised and moved by means of the assembly crosshead 500. For this purpose, a first lifting element 502 and a second lifting element 504 extend from a first attachment point 506 on the assembly crosshead 500 to the holding device 300. The first lifting element 502 additionally has an attachment point on the holding device 300 that is arranged on the side of the main section on which the second projecting section 330 is arranged. The second lifting element 504 extends from the first attachment point 506 to a region of the main section of the holding device 300 that is arranged on the side on which the first projecting section 320 is arranged.

Arranged at a distance from the first attachment point 506 in the longitudinal direction of the assembly crosshead 500 there is a second attachment point 512. Starting from the first attachment point 512, a third lifting element 508 and a fourth lifting element 510 extend to the first projecting section 320 and to the second projecting section 330. In the case of this variant, the holding device 300 is raised at the two attachment points 506, 512 and brought into an installation position by means of the assembly crosshead 500. The shell segment is preferably oriented in such a manner that the holding device 300 can be lifted in horizontally. The attachment points 506, 512 preferably have a maximum load application of 14 kilonewtons.

Figure 9:
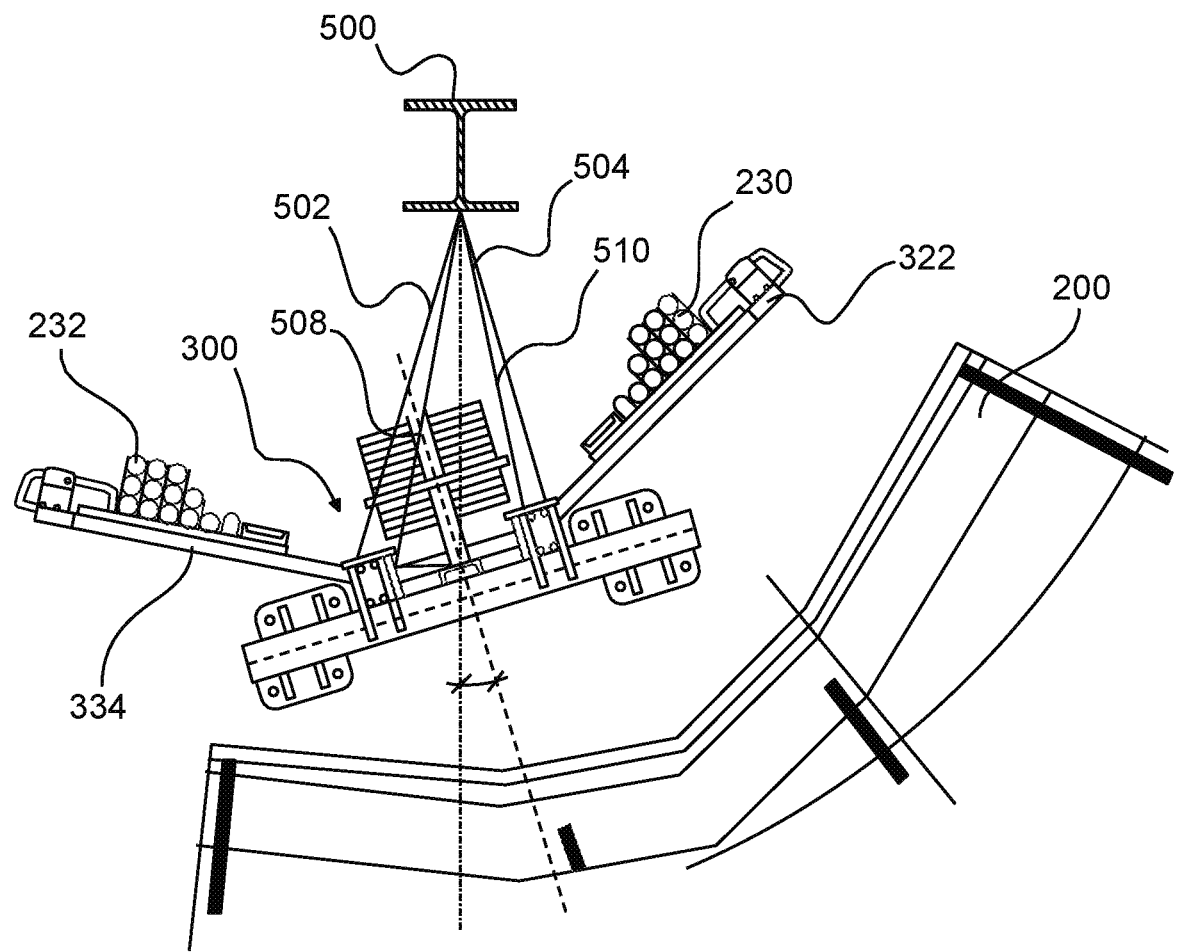
FIG. 9 shows a schematic two-dimensional view of an exemplary assembly operation.

FIG. 9 shows the assembling of a wind-power-installation tower segment 120 in which a holding device 300 is being arranged on a first shell segment 200. In this case, the lifting elements 504, 510 have a shorter extent than the lifting element 502 and 508. Consequently, the holding device 300 hangs obliquely, at a defined angle, under the assembly crosshead 500. A holding device 300 can thus be arranged even on a shell segment 200 that is not arranged centrally. In this case, the shell segment 200 is not oriented in such a manner that the holding device 300 can be lifted in horizontally, but is rotated by 17 degrees of arc, with the result that the shorter extent of the lifting elements 504, 510 is required in order for the holding device to be turned in a manner consistent with the shell segment 200.

Figure 10:
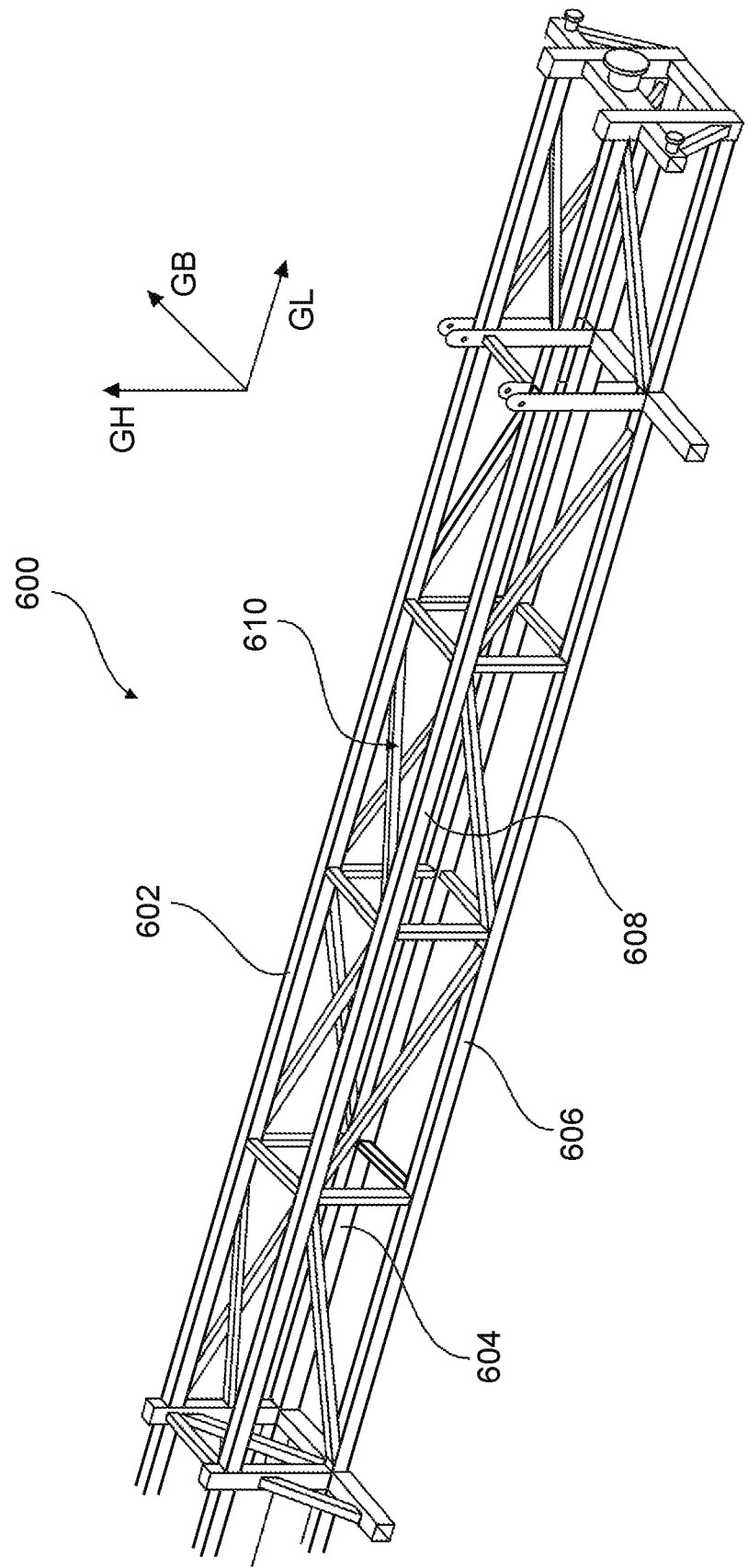
FIG. 10 shows a schematic three-dimensional view of an exemplary embodiment of a first transport device.

FIG. 10 shows a schematic three-dimensional view of an exemplary embodiment of a first transport device. The first transport device 600 extends in the frame longitudinal direction GL, in the frame width GB and in the frame height GH. Orthogonally to the frame longitudinal direction GL, the first transport device has a substantially rectangular cross-section. The first transport device 600 is constituted substantially by a first frame bar 602, a second frame bar 604, a third frame bar 606 and a fourth frame bar 608. The frame bars 602-608 are substantially parallel to the frame longitudinal direction GL. In addition, the first transport device 600 comprises bars that are oriented parallel to the frame height or parallel to the frame width, and that connect the frame bars 602-608 to each other. In addition, crossbraces 610 extend between the frame bars 602-608.

Figure 11:
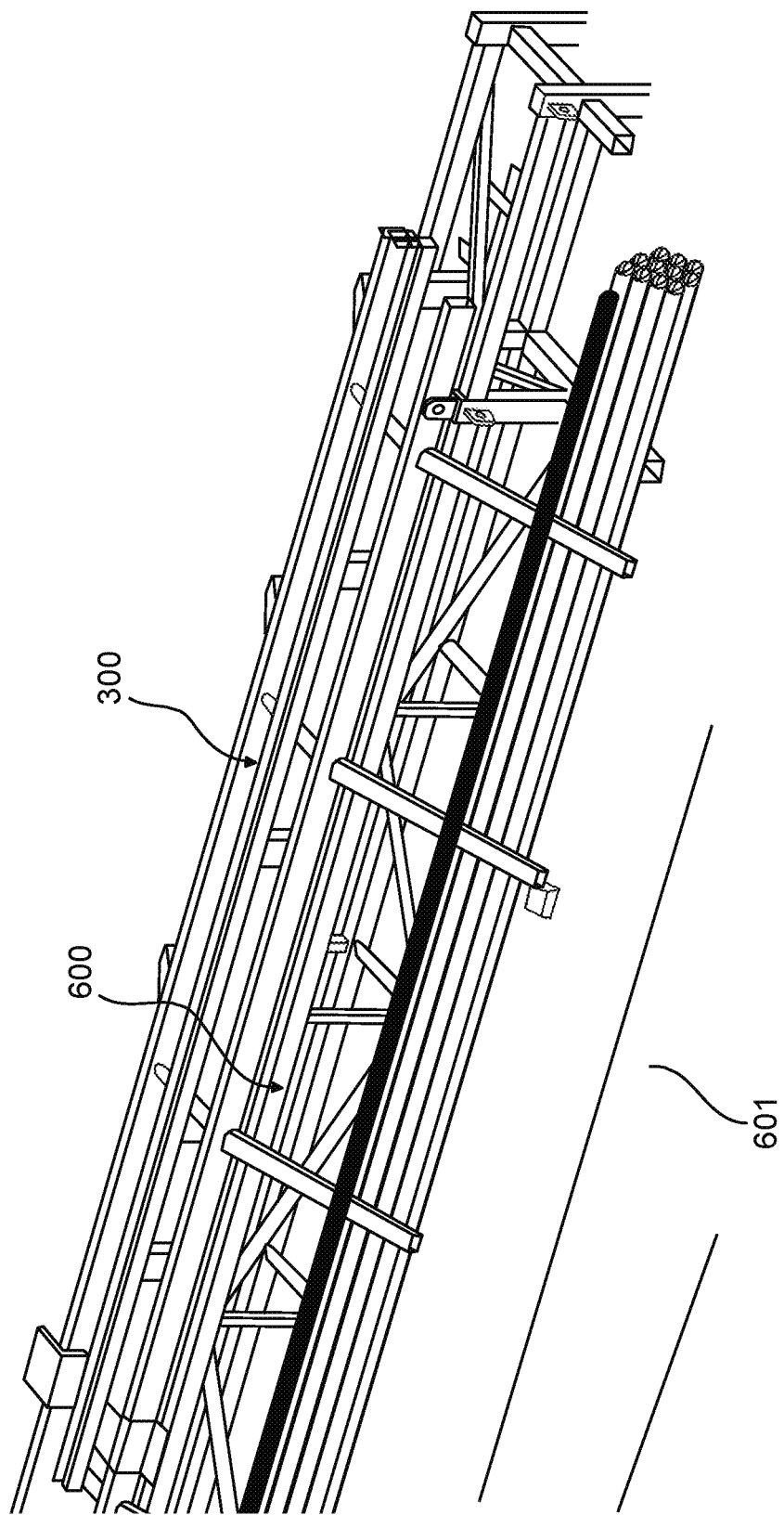
FIG. 11 shows a schematic three-dimensional view of transport of a wind-power-installation tower segment by means of the first transport device shown in FIG. 10.

As shown in FIG. 11, the first transport device 600 may be arranged on a supporting surface 621. A holding device 300 may then be arranged, in particular with its main section, on the first transport device 600. Owing to the angle of the holding device, the projecting sections extend from the main section arranged on the first transport device to the supporting surface 621. The holding device 300 can thus be arranged in a stress-free manner on the supporting surface 621.

Figure 12:
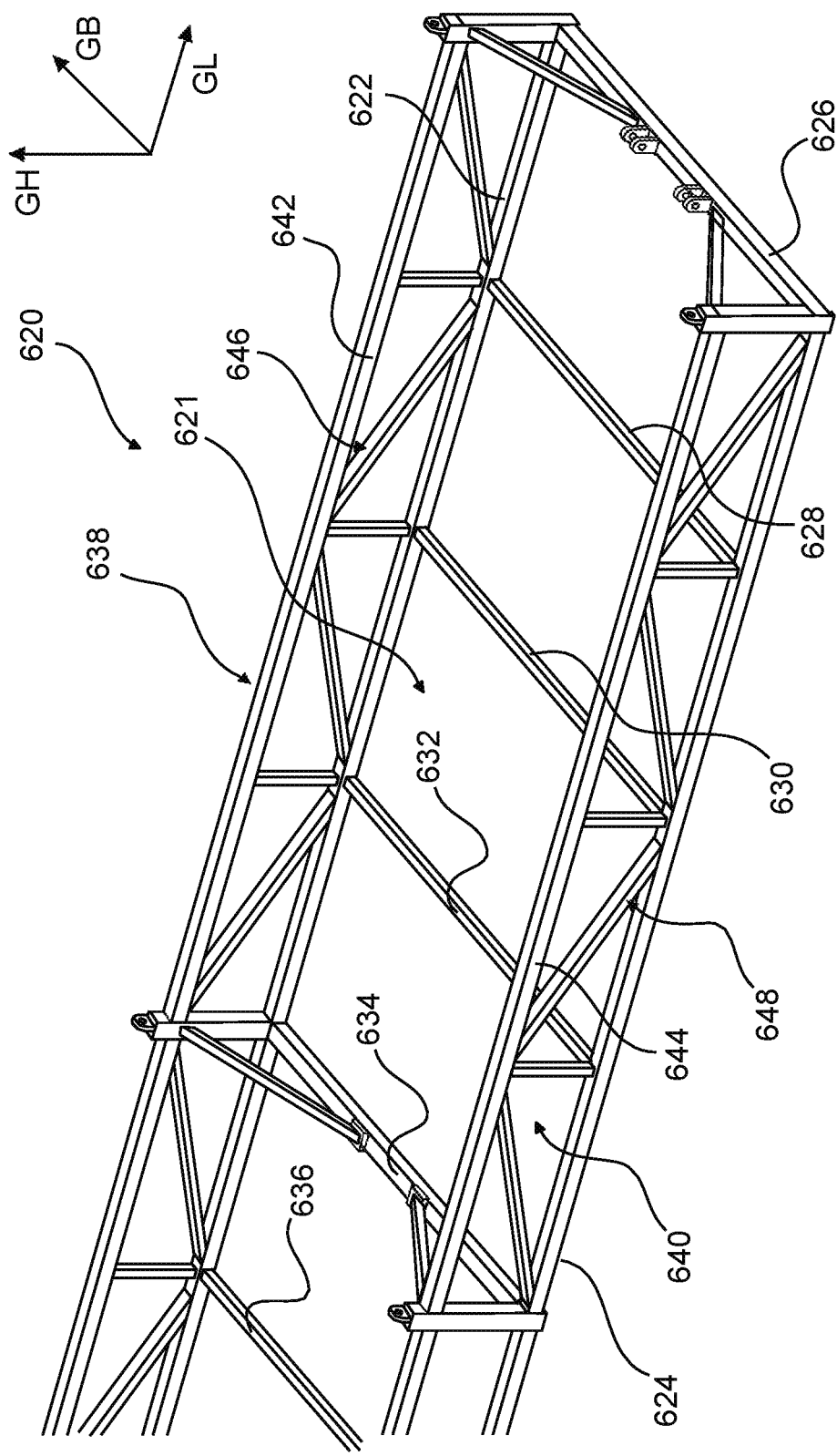
FIG. 12 shows a schematic three-dimensional view of an exemplary embodiment of a second transport device.

FIG. 12 shows a schematic three-dimensional view of an exemplary embodiment of a second transport device. The second transport device 620 extends in the frame longitudinal direction GL, in the frame width GB and in the direction of the frame height GH. Extending in the direction of the frame width are a first frame transverse bar 626, a second frame transverse bar 628, a third frame transverse bar 630, a fourth frame transverse bar 632, a fifth frame transverse bar 634 and a sixth frame transverse bar 636. The frame transverse bars 626-636 extend between a first frame longitudinal bar 622 and a second frame longitudinal bar 624. The frame longitudinal bars 622, 624 are oriented substantially parallel to the frame longitudinal direction GL.

Arranged at a distance from the first frame longitudinal bar 622 in the direction of the frame height GH there is a first shoulder longitudinal bar 642. Bars are arranged for the purpose of spacing between the first frame longitudinal bar 622 and the first shoulder longitudinal bar 642. A first frame shoulder 638 is constituted by the first shoulder longitudinal bar 642, a first transverse bracing 646 and the aforementioned bars for connecting the first frame longitudinal bar 622 and the first shoulder longitudinal bar 642. Likewise, the second shoulder longitudinal bar 644 is spaced from the second frame longitudinal bar 624 in the direction of the frame height GH. In addition, there is a second transverse bracing 648 arranged between the second frame longitudinal bar 624 and the second shoulder longitudinal bar 644, such that, in a manner similar to the first frame shoulder 638, these elements realize a second frame shoulder 640.

Figure 13:
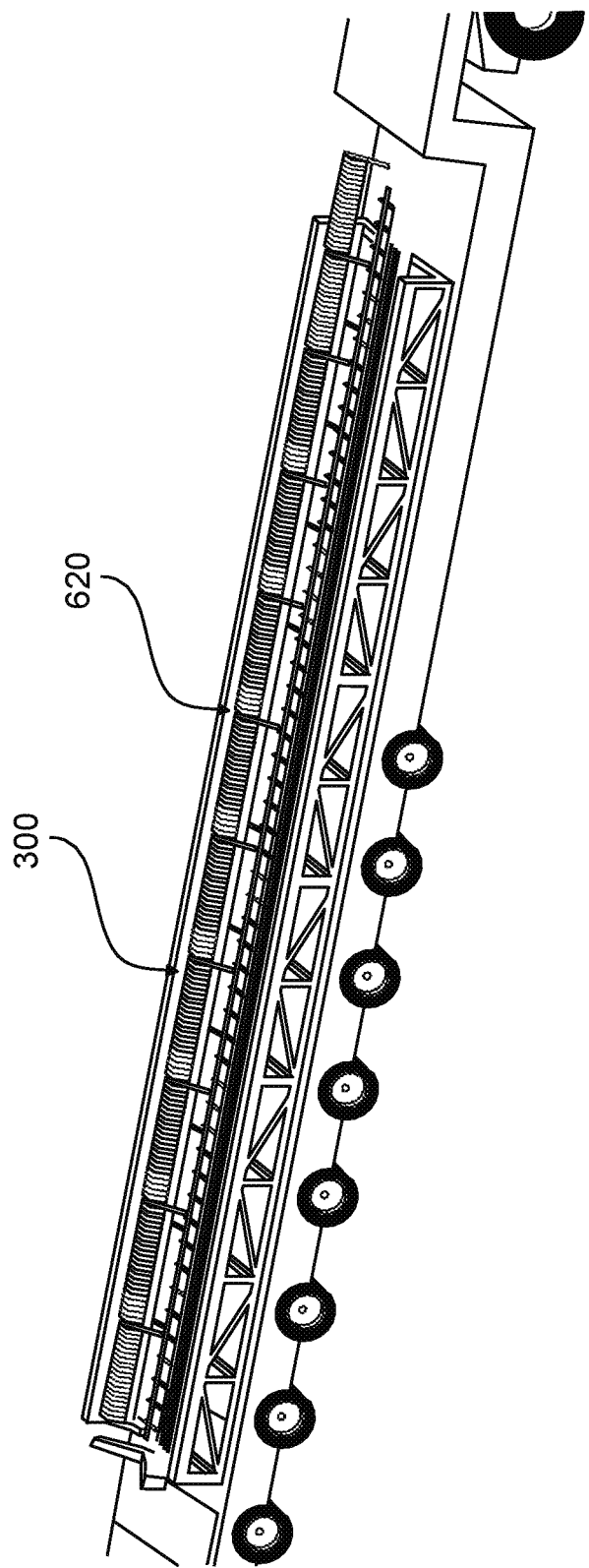
FIG. 13 shows a schematic three-dimensional view of an operation of transporting a wind-power-installation tower segment by means of a second transport device shown in FIG. 12.

The frame longitudinal bars 622, 624 and the frame transverse bars 626-636 form a non-closed supporting surface 621. A holding device 300 can be arranged on this supporting surface 621, as shown in FIG. 13. Owing to the angle of the holding device, the two projecting sections extend partially away upward, and can be placed on the first frame shoulder 638 and the second frame shoulder 640, respectively. Consequently, the holding device 300 can also be placed substantially in a stress-free manner on the second transport device 620.

A wind-power-installation tower segment 120 has the particular advantage that it can be already preassembled in a cost-effective manner before a wind-power-installation tower 102 is assembled, in that the holding device 300 is at least arranged on the first shell segment 200. The preassembling may be performed, for example, at the workshop or at the erection site of the wind power-installation-tower 102. Moreover, the design of the holding device 300 is advantageously characterized by the fact that it requires only a small amount of space within a tower. This is realized by the main section 310 and the holding-device angle 302 between the main section and the first projecting section 320 and the second projecting section 330.

Furthermore, particularly advantageously, cable bundles 230, 232 may be arranged on the first projecting section 320 and the second projecting section 330. In particular, there is no need for an additional assembly platform inside the wind-power-installation tower 102 for fitting the cable bundles 230, 232 on the projecting portions 320, 330. Moreover, the holding device 300 may be arranged in such a manner, in particular with the use of correspondingly far projecting bearing connections 454, 455, that a fitter on the holding device 300 does not have to work overhead.

REFERENCES 100 wind power installation
102 tower 104 nacelle
106 rotor
108 rotor blades
110 spinner
120, 130 wind-power-installation tower segment
121 coupling section
132, 400 coupling device
133 transition region
134 connection point
135, 300 holding device
200 first shell segment
202 upper horizontal abutment side
203 joint
210 second shell segment
220 third shell segment
230 first cable bundle
232 second cable bundle
302 holding-device angle
310 main section
312 first longitudinal member
314 second longitudinal member
316 central longitudinal member
318 main crossmember
320 first projecting section
322 first projecting crossmember
324 second projecting crossmember
326 third projecting crossmember
328 fourth projecting crossmember
330 second projecting section
332 fifth projecting crossmember
334 sixth projecting crossmember
336 seventh projecting crossmember
338 eighth projecting crossmember
340 ladder
402 coupling crossbeam
404 first connecting rib
406 second connecting rib
408 first fastening plate
410 second fastening plate
412 supporting plate
414 first coupling tie-piece
416 second coupling tie-piece
450, 452, 454 horizontal bearing
453 bearing crossbeam
454 first bearing connection
455 second bearing connection
456 connection plate
457 first bearing element
458 second bearing element
459 first bearing plate
460 second bearing plate
500 assembly crosshead
502 first lifting element
504 second lifting element
506 first attachment point
508 third lifting element
510 fourth lifting element
512 second attachment point
600 first transport device
601 supporting surface
602 first frame bar
604 second frame bar
606 third frame bar
608 fourth frame bar
610 crossbrace
620 second transport device
621 supporting surface
622 first frame longitudinal bar
624 second frame longitudinal bar
626 first frame transverse bar
628 second frame transverse bar
630 third frame transverse bar
632 fourth frame transverse bar
634 fifth frame transverse bar
636 sixth frame transverse bar
638 first frame shoulder
640 second frame shoulder
642 first shoulder longitudinal bar
644 second shoulder longitudinal bar
646 first transverse bracing
648 second transverse bracing
D segment thickness
GB frame width
GH frame height
GL frame longitudinal direction
H segment height
R segment ring direction

The invention claimed is:
1. A wind-power-installation tower segment for a wind-power-installation tower, comprising:
   a shell segment, having:
      a segment height, a segment ring direction, and a segment thickness, and
      an upper horizontal abutment side and a lower horizontal abutment side,
   a holding device for arranging requisites inside a wind-power-installation tower segment, having:
      a main section, and
      at least one projecting section,
      wherein the main section and the at least one projecting section are arranged adjacently to each other in the segment ring direction, and
      wherein the main section and the at least one projecting section enclose a holding-device angle,
   a coupling device arranged in a coupling section of the shell segment, adjoining the upper horizontal abutment side,
   a vibration damper, and
   a horizontal bearing,
   wherein the holding device is coupled to the shell segment by the coupling device,
   wherein the vibration damper is arranged and configured to damp vibrations orthogonal to the segment height or in a direction of main extent of the holding device, or both,
   wherein the horizontal bearing comprises the vibration damper, and
   wherein the vibration damper comprises one or more plates bearing against the holding device, wherein the one or more plates are a plastic material.
2. The wind-power-installation tower segment as claimed in claim 1, comprising a horizontal bearing arranged in a bearing section and adjoining the lower horizontal abutment side of the shell segment,
   wherein the holding device is supported by the horizontal bearing, and
   wherein the horizontal bearing is configured to act:
      as a fixed bearing for bearing forces orthogonal to the segment height, or to a to the direction of main extent of the holding device, or both, or
      as a loose bearing for bearing forces in the direction of the segment height, or the direction of main extent of the holding device, or both.

3. The wind-power-installation tower segment as claimed in claim 1, wherein:
- the coupling device is arranged and configured to couple the holding device to the shell segment in such a manner that the direction of main extent of the holding device is oriented substantially vertically, and
- the coupling device is arranged on the holding device and configured to act as a fixed bearing for forces acting in a direction of the segment height or the direction of main extent of the holding device, or both.

4. The wind-power-installation tower segment as claimed in claim 1 comprising a ladder arranged on the main section.

5. The wind-power-installation tower segment as claimed in claim 1, wherein the at least one projecting section comprises a first projecting section and a second projecting section, wherein the first projecting section is arranged on a first side of the main section, and the second projecting section is arranged on a second side of the main section that is opposite the first side.

6. The wind-power-installation tower segment as claimed in claim 1, comprising at least one cable arranged on the at least one projecting section, and
- wherein the at least one cable is spaced less than 1.5 meters from the main section.

7. The wind-power-installation tower segment as claimed in claim 1, wherein the holding-device angle is less than 170 degrees of arc.

8. The wind-power-installation tower segment as claimed in claim 1, wherein:
- the shell segment has an axis of symmetry, and
- the holding device extends from an upper holding end to a lower holding end.

9. A wind-power-installation tower comprising at least one wind-power-installation tower segment as claimed in claim 1.

10. A wind power installation comprising the wind-power-installation tower as claimed in claim 9.

11. The wind-power-installation tower segment as claimed in claim 1, wherein the holding-device angle is between 170 degrees and 145 degrees.

12. The wind-power-installation tower segment as claimed in claim 1, wherein the holding-device angle is less than 145 degrees.

13. A method for assembling the wind-power-installation tower segment as claimed in claim 1, the method comprising:
- raising the holding device by at least three transport elements,
  - wherein the at least three transport elements are arranged at a fastening point of a lifting mechanism, and
  - wherein the at least three transport elements are arranged at at least three fastening points of the holding device, wherein at least two fastening points of the at least three fastening points are spaced in the direction of main extent of the holding device, and at least two fastening points of the at least three fastening points are spaced in a width direction,
- arranging the holding device on an inner circumferential surface of a shell segment, and coupling the holding device to the shell segment using a coupling device.

14. The method as claimed in claim 13, comprising:
- arranging the at least three lifting elements between a crosshead and the holding device, and
- wherein the lifting elements are arranged, on the crosshead, at at least two crosshead fastening points, wherein the two crosshead fastening points are spaced from each other in a longitudinal direction of the crosshead.

15. A method for assembling a wind-power-installation tower section, the method comprising:
- arranging the wind-power-installation tower segment of claim 1 and a second shell segment in such a manner that the wind-power-installation tower segment and the second shell segment abut against each other at vertical abutment sides; and
- fastening the wind-power-installation tower segment and the second shell segment to each other.

* * * * *